United States Patent [19]

Tazi et al.

[11] Patent Number: 4,962,185
[45] Date of Patent: Oct. 9, 1990

[54] PROCESS OF RENDERING COPOLYMER POWDERS OF MALEIC ANHYDRIDE AND AN ALKYL VINYL ETHER PREPARED IN BENZENE SOLVENT SUBSTANTIALLY BENZENE-FREE

[75] Inventors: Mohammed Tazi, Wayne, N.J.; Yoon T. Kwak, Brooklyn, N.Y.; Krystyna Plochocka, Scotch Plains, N.J.

[73] Assignee: GAF Chemicals Corporation, Wayne, N.J.

[21] Appl. No.: 415,834

[22] Filed: Oct. 2, 1989

[51] Int. Cl.$^5$ ............................................... C08F 6/00
[52] U.S. Cl. .................................... 528/497; 528/491; 526/271
[58] Field of Search ............... 526/271; 528/497, 491; 203/39

[56] References Cited

U.S. PATENT DOCUMENTS 3,318,851  5/1967  Nicholls et al. ............... 526/271 X
4,532,320  7/1985  Denzinger et al. ................ 528/498

Primary Examiner—Joseph L. Schofer
Assistant Examiner—F. M. Teskin
Attorney, Agent, or Firm—Walter Katz; Marilyn J. Maue; Joshua J. Ward

[57] ABSTRACT

Substantially benzene-free copolymers of maleic anhydride and alkyl vinyl ethers having benzene present in an amount of less than 1 ppm and toluene present in an amount of about 2.0 wt. % or less are provided by treating the copolymer powder with toluene at a temperature of about 115° C. to about 125° C.

9 Claims, No Drawings

PROCESS OF RENDERING COPOLYMER POWDERS OF MALEIC ANHYDRIDE AND AN ALKYL VINYL ETHER PREPARED IN BENZENE SOLVENT SUBSTANTIALLY BENZENE-FREE

BACKGROUND OF THE INVENTION

1. Field of the Invention

This invention relates to copolymer powders of maleic anhydride and alkyl vinyl ethers prepared in benzene solvent, and, more particularly, to a process of rendering such powders substantially benzene-free.

2. Description of the Prior Art

High molecular weight copolymers of maleic anhydride and alkyl vinyl ethers, e.g. $C_1$–$C_5$ alkyl vinyl ethers, such as methyl vinyl ether, are prepared advantageously by precipitation polymerization in benzene solvent because of low chain transfer, in which the monomers are soluble but the copolymer is insoluble. Such copolymers, and their half-esters, hydrolyzed free acid and salts, find wide commercial use in adhesives, coatings, pharmaceuticals, hairsprays, thickeners, protective colloids, detergents and denture adhesives. However, benzene is not desired in such products; it can be removed only by hydrolysis of the product in water followed by azeotropic distillation. Benzene is more difficult to remove, however, from the anhydride form of the polymer. Generally, such removal procedures have involved drying the benzene-containing copolymers at relatively high temperatures and for long periods of time. Unfortunately, the remaining benzene content of the anhydride copolymer still is about 1-3% by weight.

U.S. Pat. No. 4,532,320 describes a process for removal of physiologically unacceptable solvents such as benzene from polymers containing anhydride groups, such as copolymers of maleic anhydride and methyl vinyl ether. The patented process comprises heating the dry copolymer powder in an aliphatic hydrocarbon such as nonane or decane at a temperature which is at or above the glass transition temperature of the copolymer, e.g. at 161° C., for a treatment mixture of equal parts of nonane and decane (see Example 7 of the patent). However, the final benzene content of the treated copolymer still was 0.03 wt. %, (300 ppm) which is an objectional amount. A benzene content of less than 1 ppm is required to be considered benzene-free.

Accordingly, an object of this invention is to provide a process of rendering copolymer powders of maleic anhydride and alkyl vinyl ethers prepared in benzene solvent substantially benzene-free in the anhydride form.

A particular object herein is to provide such copolymers having benzene present in an amount of less than 1 ppm and which are otherwise acceptable from a physiological standpoint.

SUMMARY OF THE INVENTION

What is described herein are substantially benzene-free copolymers of maleic anhydride and alkyl vinyl ethers having benzene present in an amount of less than 1 ppm and an alkyl-substituted aromatic hydrocarbon present in an amount of 2.0 wt. % or less.

The invention herein also includes rendering a copolymer powder of maleic anhydride and an alkyl vinyl ether prepared in benzene solution substantially benzene-free. The process of the invention comprises treating the copolymer powder with toluene which can swell the copolymer and release residual benzene therefrom.

DETAILED DESCRIPTION OF THE INVENTION

The process of the invention is illustrated by Steps A through C below which steps produce a substantially benzene-free copolymer of maleic anhydride and an alkyl vinyl ether.

Step A

In this step, the copolymer is made by precipitation polymerization of maleic anhydride and a $C_1$–$C_5$ alkyl vinyl ether in benzene solution. Generally these copolymers contain about 50 mole % of maleic anhydride and are of high molecular weight, characterized by specific viscosities above 2.0, generally in the range of about 2.6 to 3.5, as measured in a 1% 2-butanone solution, although both low and medium range molecular weight copolymers are considered within the purview of the invention.

The polymerization reaction preferably is carried out at about 80° C., or below, and most preferably at about 40°–75° C., in the presence of a polymerization initiator, such as a peroxide, a hydroperoxide, an azo compound or a redox catalyst, or a mixture thereof, for about 4–5 hours.

The benzene solvent usually is present during the polymerization at a level of about 75% by weight of the reaction mixture.

The reaction product appears as a slurry of solid copolymer suspended in benzene.

Step B

The bulk of the benzene medium in the slurry then is removed by filtration, centrifugation, or decantation and/or stripping distillation under reduced pressure Thereafter, conventional drying of the wet state copolymer to a powder removes benzene from its surface but leaves benzene entrapped within the polymer chains.

Step C

In this step, the copolymer powder is contacted with toluene which can remove residual benzene from the copolymer. The toluene functions by swelling the copolymer and extracting benzene entrapped within the polymer chains, and by dissolving benzene present on the surface of the copolymer.

The toluene liquid is (1) capable of effectively swelling the copolymer powder to release benzene therein, (2) miscible with benzene, (3) doesn't affect the characteristics of the copolymer, i.e., the copolymer is insoluble in the organic liquid and is otherwise unaffected by its presence, (4) has a boiling point above, but not excessively higher than, that of benzene, and (5) is environmentally and physiologically acceptable in small amounts in the final product.

Toluene is added to the copolymer powders and refluxed at a temperature of about 115° C. to about 125° C., under conditions which maintain the copolymer powders in slurry form in the toluene liquid. The residual benzene in the copolymer powder then is removed by stripping off a mixture of benzene and toluene, preferably while fresh toluene is being added to maintain a slurry condition. During this process, the copolymer is swelled by the toluene, which releases its benzene and it is replaced by toluene. As a result, the copolymer shrinks and its bulk density is increased.

Treatment temperatures below 115° C. are not particularly effective to swell and remove residual benzene from the copolymer powders, while treatment temperatures above 125° C. cause discoloration and lumping of the copolymer powders.

Suitable mixtures of toluene to copolymer comprise about 2:1 to 20:1 by weight respectively. Final drying of the thus-treated powders to remove substantially all of the residual toluene provides copolymer powders having less than 1 ppm benzene, a toluene content of about 2.0 wt. % or less, and a bulk density which is increased from 30 g/100 cc (before treatment) to 40 g/100 cc (after treatment at 125° C. for 4 hours).

In a typical run, the copolymer powders, e.g. Gantrez AN-169 (GAF Corp.) is treated with toluene in a ratio which will maintain a slurry, e.g. about 1 to 8 parts by weight, respectively, in a pressure reactor, at the desired temperature of about 115° to 125° C., for a reflux time of about 1 to 24 hours, preferably about 2 to 4 hours. The toluene may be added at one time, or in two or more stages, with reflux for a predetermined period of time after each addition.

In order to effect the reflux treatment in toluene at the desired temperatures of about 115° to 125° C., which are above the boiling point of toluene of 111° C., it is necessary to use a pressure reactor.

After treatment with toluene, both residual benzene and the treating toluene liquid are removed from the copolymer, preferably by distillation, whereupon benzene (b.pt. 80° C.) is removed first, followed by toluene liquid (b.pt. 110° C.) This treatment may be repeated several times, if necessary, to reduce the benzene content to the desired level of 1 ppm or less.

Finally, the treated copolymer may be dried, suitably in a forced-air drier, or similar apparatus, generally overnight at 60° C.

The maleic anhydride-alkyl vinyl ether copolymer product thus obtained is substantially benzene-free, that is, it has a benzene content of less than 1 ppm, and a toluene content of about 2.0 wt. % or less.

This invention now will be described with reference to the following examples.

EXAMPLE

Step A

Preparation of Slurry of Copolymer of Maleic Anhydride-methyl Vinyl Ether in Benzene Maleic anhydride, 73.6 g, is charged into a 1-1 pressure reactor with benzene, 480 g, as a solvent. The system is purged three times with nitrogen and methyl vinyl ether, 65.3 g, is fed into the reactor over a period of 4 hours while the reaction mixture is kept at 70° C. Copolymerization of maleic anhydride and methyl vinyl ether is initiated with decanoyl peroxide, 0.178 g. After completion of the addition of methyl vinyl ether, the reaction mixture is held at 70° C. for 1 hour. The reaction product is discharged from the reactor in the form of a slurry of the copolymer in benzene.

Step B

The product is dried to provide powders of the copolymer having 1.4% benzene, a bulk density of 30 g/100 cc, and a specific viscosity of 3.0 in 1% 2-butanone solution.

Step C

Preparation of Benzene-Free Maleic Anhdydride-Methyl Vinyl Ether Copolymer Product The copolymer powders obtained in Step B then are subjected to a treatment cycle consisting of (1) addition and reflux of toluene at the predetermined temperature of 115° C. to 125° C. under pressure conditions; and (2) stripping off of both benzene and toluene under vacuum. The resulting product is dried overnight in a forced air oven at 60° C.

Tables 1 and 2 below gives the results of carrying out this step under different experimental conditions.

TABLE 1

| | Process Conditions | | | | Copolymer Product | |
|---|---|---|---|---|---|---|
| Ex. No. | Toluene: Copolymer Wt. Ratio | Reflux Treatment Temperature | Contact Time (hrs) | No. of Cycles | Wt. % Toluene | Benzene (ppm) |
| 1 | 18:1 | 118° C. | 4 | 2 | 1.2 | <1 |
| 2 | 10:1 | 125° C. | 1 | 2 | 1.9 | <1 |
| 3 | 10:1 | 118° C. | 4 | 2 | 1.6 | <1 |
| 4 | 8:1 | 120° C. | 4 | 1 | 1.7 | <1 |

TABLE 2

| Commercial Gantrez AN-169 Powders | | | Bulk Density g/100 cc | Specific Viscosity | |
|---|---|---|---|---|---|
| Without treatment | | | 29.97 | 3.0 | |
| With treatment | | | | | |
| Toluene:Copolymer | Reflux Temp. (°C.) | Contact Time (hrs.) | No. Cycles | Bulk Density | Specific Viscosity |
| 10:1 | 118° | 1 | 2 | 30.16 | 2.96 |
| 10:1 | 118° | 4 | 2 | 31.88 | 2.98 |
| 10:1 | 125° | 1 | 2 | 34.43 | 3.0 |
| 10:1 | 125° | 2 | 2 | 40.45 | 2.98 |
| 10:1 | 132° | 1 | 2 | 42.33 | 2.96 |

As shown in Tables 1 and 2 above, the product obtained by toluene treatment of dry copolymer powders of specific viscosity 3.0 provides a substantially benzene-free maleic anhydride-methyl vinyl ether copolymer having less than 1 ppm of benzene and containing toluene in an amount of 2.0 wt. % or less, and an increased bulk density at about the same specific viscosity.

While the invention has been described with respect to certain embodiments thereof, it will be understood that changes and modifications may be made which are within the shell of the art. Accordingly, it is intended to be bound only by the appended claims in which:

What is claimed is:

1. A process of rendering copolymer powders of maleic anhydride and a $C_1$–$C_5$ alkyl vinyl ether containing residual benzene solvent therein substantially benzene-free, which comprises treating the copolymer powders with toluene at a temperature of about 115° C. to about 125° C.

2. A process according to claim 1 wherein said treatment is carried out by refluxing under pressure conditions.

3. A process according to claim 1 wherein said treatment is carried out for about 1 to 24 hours.

4. A process according to claim 1 wherein said treatment is carried out in a 2:1 to 20:1 weight ratio of toluene to copolymer.

5. A process according to claim 1 wherein said copolymer is contacted with toluene during a predetermined period of time at said selected temperature sufficient to swell said copolymer and release benzene therefrom and the released benzene is removed by distillation.

6. A process according to claim 5 wherein toluene is added while a mixture of benzene in toluene is removed.

7. A process according to claim 5 which treatment also includes removing substantially all of said toluene and said residual benzene, and, thereafter, drying the copolymer, so that the final treated copolymer powders have a benzene content of less than 1 ppm and a toluene level of about 2.0% or less.

8. A process according to claim 7 wherein said copolymer powder is refluxed several times with selected amounts of toluene, and benzene and toluene are removed after each addition.

9. A process according to claim 1 wherein the toluene to copolymer weight ratio is about 8:1.

* * * * *